United States Patent
Kim

(10) Patent No.: US 6,961,656 B2
(45) Date of Patent: Nov. 1, 2005

(54) APPARATUS FOR INDICATING DISTANCE TO EMPTY OF A VEHICLE, AND A METHOD THEREOF

(75) Inventor: Jong Koo Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/746,998

(22) Filed: Dec. 23, 2003

(65) Prior Publication Data

US 2005/0060087 A1 Mar. 17, 2005

(30) Foreign Application Priority Data

Sep. 16, 2003 (KR) .................................. 10-2003-0064082

(51) Int. Cl.⁷ ............................................. G06F 19/00
(52) U.S. Cl. ....................................................... 701/123
(58) Field of Search ............................... 701/123, 104; 700/236, 281–283

(56) References Cited

U.S. PATENT DOCUMENTS 4,400,779 A * 8/1983 Kosuge et al. ............. 701/123
5,006,829 A * 4/1991 Miyamoto et al. ......... 340/459
6,275,768 B1 * 8/2001 Zobell et al. ............... 701/123

FOREIGN PATENT DOCUMENTS

| DE | 3001470 | 7/1981 |
|----|---------|--------|
| DE | 3122757 | 4/1982 |
| DE | 3326719 | 1/1984 |
| DE | 19537024 | 4/1996 |
| DE | 19929426 | 12/2000 |
| JP | 2003-166868 | 6/2003 |

* cited by examiner

Primary Examiner—Thu V. Nguyen
(74) Attorney, Agent, or Firm—Morgan Lewis & Bockius LLP

(57) ABSTRACT

In an apparatus and a method for indicating initial distance to empty (DTE) at completion of fueling, the initial DTE is calculated based on a fluctuating fuel consumption rate and is compensated by a compensation value so that DTE can be determined with more accuracy compared with an initial DTE calculated based on the fixed fuel consumption rate. The DTE to be confirmed can be thereby prevented from abruptly changing.

4 Claims, 2 Drawing Sheets

APPARATUS FOR INDICATING DISTANCE TO EMPTY OF A VEHICLE, AND A METHOD THEREOF

CROSS-REFERENCE TO RELATED APPLICATIONS

This application claims priority of Korean Application No. 10-2003-0064082, filed on Sep. 16, 2003, the disclosure of which is incorporated fully herein by reference.

FIELD OF THE INVENTION

The present invention relates to a fuel level indicator and, more particularly, to an apparatus and a method for indicating an initial distance to empty.

BACKGROUND OF THE INVENTION

Generally, vehicle speed and distance traveled is displayed on a gauge cluster of a vehicle. Systems for calculating and displaying the distance to empty (DTE) with respect to the amount of fuel in the vehicle have recently been disclosed. In the case of a conventional system, the amount of remaining fuel is detected, and the DTE is derived from calculation of a fixed fuel consumption rate multiplied by the amount of fuel.

However, when calculating the DTE based on the fixed fuel consumption rate, variables in driving conditions such as driving style and road state are not reflected in the DTE such that there is often a substantial difference between the indicated DTE and the actual DTE, which causes confusion and/or inconvenience.

Accordingly, in order to prevent such confusion, a method of calculating the DTE based on a fluctuating fuel consumption rate, which reflects changes in driving conditions, is currently used. However, in the case of calculating the DTE based on fluctuating fuel consumption rate, there is a problem in that indicated DTE can be unexpectedly decreased or increased such that the driver is confused and confidence with respect to the indicated DTE is deteriorated.

SUMMARY OF THE INVENTION

Embodiments of the present invention provide non-limiting advantages in preventing unexpected changes in the indicated DTE and enhancing confidence in the indicated DTE by appropriately calculating and compensating an initial DTE at the completion of fueling.

An exemplary apparatus for indicating an initial distance to empty at completion of fueling comprises first means for detecting the amount of fuel in a fuel tank; second means for detecting if the fuel tank lid is open or closed; third means for detecting the vehicle speed; fourth means for calculating a fluctuating fuel consumption rate based on information from the first means, second means, and third means, and calculating an initial distance to empty available from the amount of fuel at completion of fueling based on the fluctuating fuel consumption rate and a predetermined fixed fuel consumption rate; and fifth means for displaying the calculated initial distance to empty.

In a further embodiment, the fluctuating fuel consumption rate is derived from calculation of traveled distance divided by the amount of fuel consumption between previous closing and current opening of the fuel tank lid.

In another embodiment, the fourth means comprises a central processing unit operated by predetermined software, and a memory storing data processed by the central processing unit, the predetermined software being programmed in order to execute instructions for: determining if the fueling of the fuel tank has started; calculating, when the fueling of the fuel tank has started, a fluctuating fuel consumption rate by calculation of traveled distance divided by amount of fuel consumed between the previous closing and the current opening of the fuel tank lid; determining if the fueling of the fuel tank is completed; determining, when the fueling of the fuel tank is completed, the amount of fuel; and calculating the initial distance to empty available from the amount of fuel at completion of fueling based on the fluctuating fuel consumption rate and the predetermined fixed fuel consumption rate.

In yet another embodiment, the calculating the initial distance to empty comprises: calculating a first distance to empty based on the predetermined fixed fuel consumption rate and the amount of fuel; calculating a second distance to empty based on the fluctuating fuel consumption rate and the amount of fuel; calculating a compensation value defined as calculation of the first distance to empty subtracted by the second distance; and calculating the initial distance to empty by calculation of the second distance to empty subtracted by the compensation value.

In another further embodiment, the fifth means for displaying is provided by a liquid crystal display apparatus.

An exemplary method for indicating an initial distance to empty at completion of fueling comprises determining if fueling of the fuel tank has started; calculating, when the fueling of the fuel tank has started, a fluctuating fuel consumption rate by calculation of traveled distance divided by amount of fuel consumption between completion of previous fueling and start of current fueling; determining if fueling of the fuel tank is completed; determining, when the fueling of the fuel tank is completed, the amount of fuel; and calculating the initial distance to empty available from the amount of fuel at completion of fueling based on the fluctuating fuel consumption rate and the predetermined fixed fuel consumption rate.

In a further embodiment, the calculating the initial distance to empty comprises: calculating the first distance to empty based on the predetermined fixed fuel consumption rate and the amount of fuel; calculating the second distance to empty based on the fluctuating fuel consumption rate and the amount of fuel; calculating a compensation value defined as calculation of the first distance to empty subtracted by the second distance; and calculating the initial distance to empty by calculation of the second distance to empty subtracted by the compensation value.

DETAILED DESCRIPTION OF THE PREFERRED EMBODIMENTS

Preferred embodiments of the present invention will hereinafter be described in detail with reference to the accompanying drawings.

Figure 1:
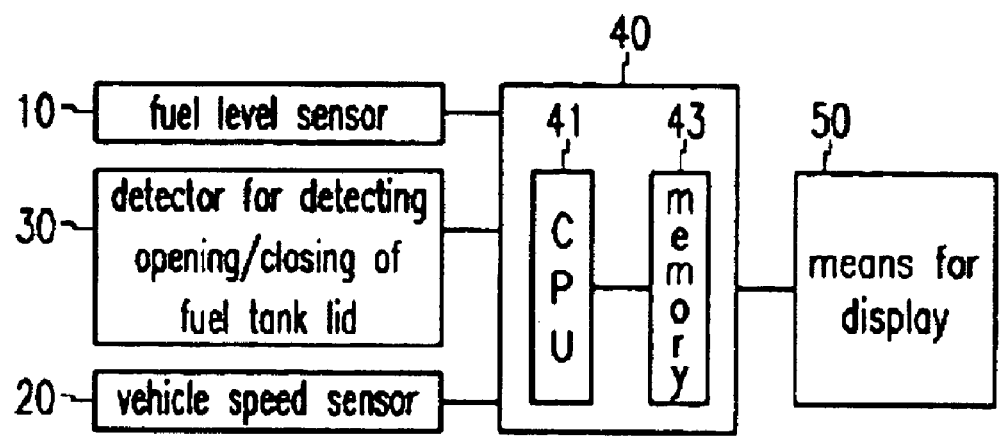
FIG. 1 is a block diagram of an apparatus for indicating an initial distance to empty at completion of fueling according to an embodiment of the present invention.

As shown in FIG. 1, the apparatus for indicating an initial distance to empty at completion of fueling comprises a detector for detecting an amount of fuel 10, a detector for detecting vehicle speed 20, a detector for detecting opening/closing of a fuel tank 30, a controller 40, and display means 50.

The fuel level sensor 10 generates a signal representative of an amount of fuel in a fuel tank, and the fuel level sensor signal is transmitted to the controller 40.

The vehicle speed sensor 20 generates a signal representative of vehicle speed, and the vehicle speed sensor signal is transmitted to the controller 40 where it is transformed into digital signals representative of the distance traveled and the vehicle speed.

The detector 30 detects a signal representative of the opening/closing of the fuel tank lid, and transmits the signal regarding the opening/closing of the fuel tank lid to the controller 40. The detector 30 can be provided by an on-off switch, which is connected or disconnected depending on that whether the fuel tank lid is closed or open such that the controller 40 can determine opening/closing of the fuel tank lid.

Furthermore, the controller 40 can determine start and completion of fueling of the fuel tank based on the opening/closing of the fuel tank lid. The controller 40 includes a central processing unit 41 and a memory 43. The signals from the fuel level sensor 10, the speed sensor 20, and the detector 30 are processed by the central processing unit 41, and the processed data, which is developed from the signals, is stored in the memory 42.

The central processing unit 41 indicates the initial DTE at the completion of fueling based on the stored data. The output DTE from the controller 40 is displayed on the means for displaying 50, and preferably the means for displaying 50 is provided as a liquid crystal display apparatus.

Figure 2:
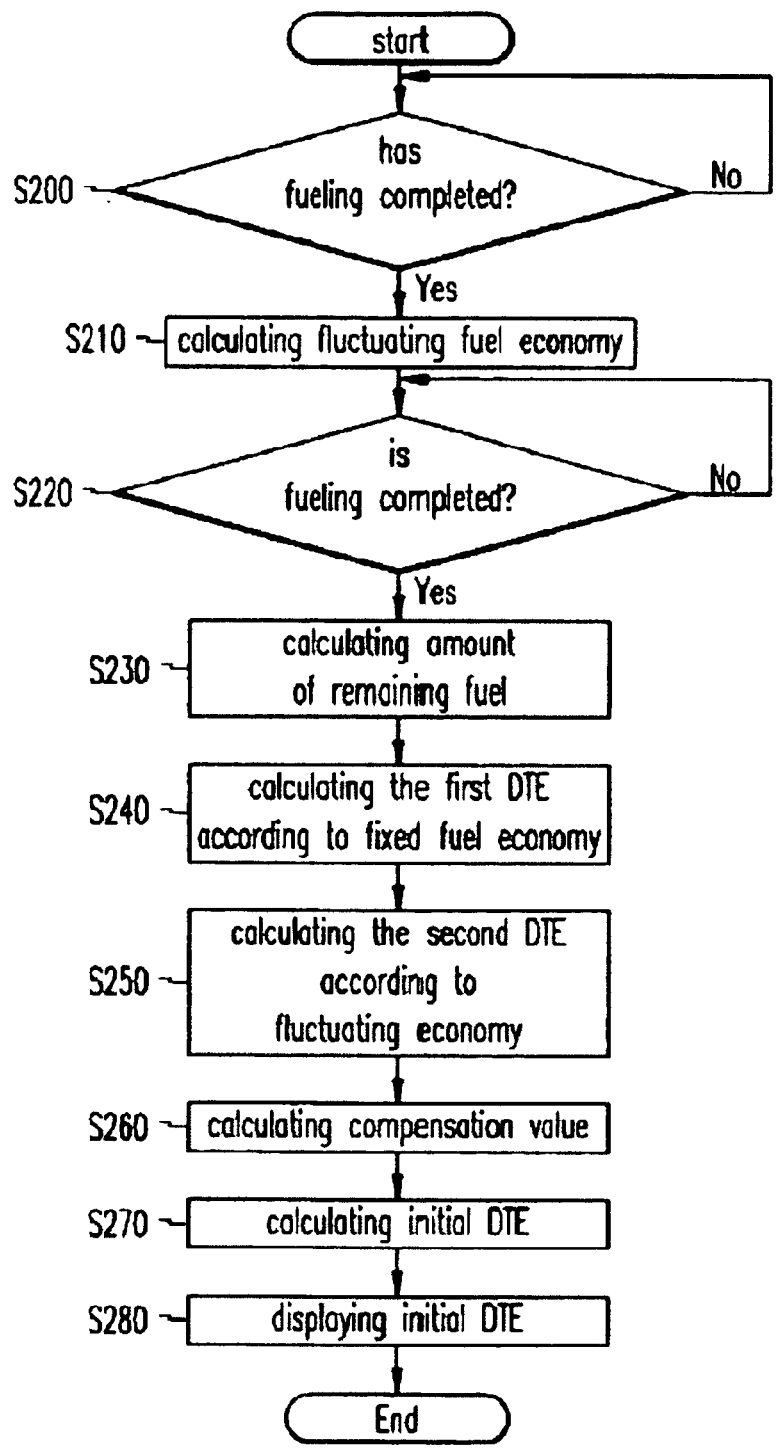
FIG. 2 is a flow diagram of a method for indicating an initial distance to empty at completion of fueling according to an embodiment of the present invention.

Operation of the controller 40 is controlled by software, and the software is programmed in order to execute the following steps, which are shown in FIG. 2.

At step S200, the controller 40 determines whether fueling of the fuel tank has started based on the signal from the detector 30.

When the signal from the detector 30, which is provided by an on-off switch, is converted from an on-signal into an off-signal, the controller 40 determines that fueling has started.

When the fueling of the fuel tank has started, the controller 40 calculates a fluctuating fuel consumption rate by calculation of distance traveled divided by amount of fuel consumption, which is calculated based on a signal from the fuel level sensor 10, between the completion of previous fueling and the start of current fueling at step 210.

At step 220, the controller 40 determines whether the fueling of the fuel tank is completed based on the signal from the detector 30.

When the signal from the detector 30, which is provided by an on-off switch, is converted from an off-signal into an on-signal, the controller 40 determines that fueling is completed.

When the fueling of the fuel tank is completed, the controller 40 determines the amount of fuel therein based on the signal from the fuel level sensor 10 at step 230.

At step S240, the controller 40 calculates a first Distance To Empty (DF) based on the predetermined fixed fuel consumption rate and the amount of fuel at the completion of fueling.

The first DTE (DF) can be derived from calculation of the predetermined fixed fuel consumption rate multiplied by the amount of fuel at the completion of fueling.

Furthermore, at step S250, the controller 40 calculates a second distance to empty (DC) based on the fluctuating fuel consumption rate and the amount of fuel at the completion of fueling.

Similarly, the second DTE (DC) can be derived from calculation of the fluctuating fuel consumption rate and the amount of fuel at the completion of fueling.

At step S260, the controller 40 calculates a compensation value for an initial DTE at the completion of fueling and the compensation value is represented by the following formula.

$$DM=(DF-DC)/2$$

wherein

DM: compensation value for initial DTE

DF: first DTE

DC: second DTE

At step S270, the controller 40 calculates the initial distance to empty available from the fuel at completion of fueling, and the initial DTE is represented by the following formula.

$$DI=DC-DM$$

wherein

DI: initial DTE at completion of fueling

DC: second DTE

DM: compensation value for initial DTE

Accordingly, in the case that the vehicle is driven after fueling is completed, the compensation value for the initial DTE (DM) prevents the initial DTE from changing abruptly.

More specifically, if the compensation value (DM) is a positive value, it means that the first DTE according to the fixed fuel consumption rate is more than the second DTE according the fluctuating fuel consumption rate so that the DTE to be confirmed is apt to be less than the second DTE according to the fluctuation fuel consumption rate. Accordingly, in order to prevent the DTE to be confirmed from abruptly being decreased, the positive compensation value is subtracted from the second DTE in advance at the step of calculating the initial DTE at the completion of fueling.

Conversely, if the compensation value (DM) is a negative value, it means that the second DTE according the fluctuating fuel consumption rate is more than the first DTE according to the fixed fuel consumption rate so that the DTE to be confirmed is apt to be more than the second DTE according to the fluctuation fuel consumption rate. Accordingly, in order to prevent the DTE to be confirmed from abruptly being increased, the negative compensation value is subtracted from the second DTE in advance at the step of calculating the initial DTE at the completion of fueling.

At step S280, the output initial DTE at completion of fueling is displayed on means for displaying 50.

According to the apparatus and method for indicating initial DTE at completion of fueling of this invention, initial DTE is basically calculated based on the fluctuating fuel consumption rate so that DTE can be indicated with more accuracy compared with the initial DTE basically calculated based on the fixed fuel consumption rate.

Furthermore, the compensation value, which is calculated by a predetermined method, is reflected on the initial DTE in advance so that the DTE to be confirmed can be prevented from abruptly changing.

What is claimed is:

1. An apparatus for indicating an initial distance to empty at completion of fueling of a vehicle, comprising:

first means for detecting an amount of fuel in a fuel tank;

second means for detecting if a fuel tank lid is open or closed;

third means for detecting the vehicle speed;

fourth means for calculating a fluctuating fuel consumption rate based on information from the first means, second means, and third means, and calculating an initial distance to empty available from the fuel at completion of fueling based on the fluctuating fuel consumption rate and a predetermined fixed fuel consumption rate; and fifth means for displaying the calculated initial distance to empty, wherein the fluctuating fuel consumption rate is derived from calculation of traveled distance divided by amount of fuel consumption between previous closing and current opening of the fuel tank lid, wherein the calculating the initial distance to empty comprises:

calculating the first distance to empty based on the predetermined fixed fuel consumption rate and the amount of fuel;

calculating the second distance to empty based on the fluctuating fuel consumption rate and the amount of fuel;

calculating a compensation value defined as the first distance to empty subtracted by the second distance to empty; and calculating the initial distance to empty by calculation of the second distance to empty subtracted by the compensation value.

2. The apparatus of claim 1, wherein the fourth means comprises a central processing unit operated by predetermined software, and a memory storing data processed by the central processing unit, the predetermined software being programmed to execute instructions for:

determining if the fueling of the fuel tank has started;

calculating, when the fueling of the fuel tank has started, a fluctuating fuel consumption rate by calculation of traveled distance divided by amount of fuel consumed between the previous closing and the current opening of the fuel tank lid;

determining if the fueling of the fuel tank is completed;

determining, when the fueling of the fuel tank is completed, the amount of fuel; and calculating the initial distance to empty available from the amount of fuel at completion of fueling based on the fluctuating fuel consumption rate and the predetermined fixed fuel consumption rate.

3. The apparatus of claim 1, wherein the fifth means for displaying is a liquid crystal display apparatus.

4. A method for indicating an initial distance to empty at completion of fueling comprising:

determining if fueling of the fuel tank has started;

calculating, when the fueling of the fuel tank has started, a fluctuating fuel consumption rate by calculation of traveled distance divided by amount of fuel consumption between completion of previous fueling and start of current fueling;

determining if fueling of the fuel tank is completed;

calculating, when the fueling of the fuel tank is completed, the amount of fuel; and calculating the initial distance to empty available from the fuel at completion of fueling based on the fluctuating fuel consumption rate and a predetermined fixed fuel consumption rate, wherein the calculating the initial distance to empty comprises:

calculating the first distance to empty based on the predetermine fixed fuel consumption rate and the amount of fuel;

calculating the second distance to empty based on the fluctuating fuel consumption rate and the amount of fuel;

calculating a compensation value defined as calculation of the first distance to empty subtracted by the second distance; and calculating the initial distance to empty by calculation of the second distance to empty subtracted by the compensation value.

* * * * *